J. R. MURPHY.
CAR STAKE.
APPLICATION FILED AUG. 1, 1911.

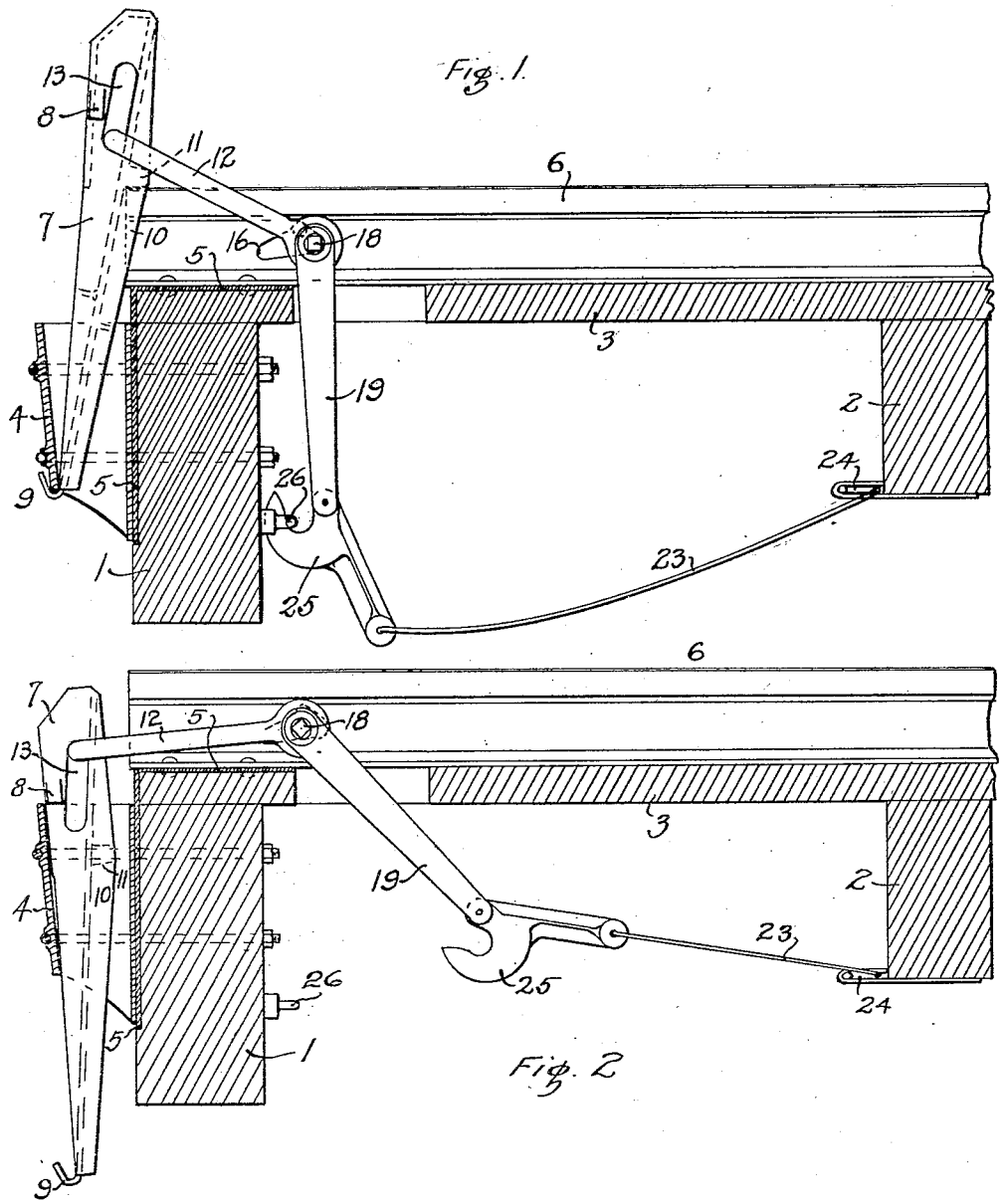

1,056,290.

Patented Mar. 18, 1913.
3 SHEETS—SHEET 2.

WITNESSES:
Thomas Langford
Charles C. Cook

INVENTOR
John R. Murphy
BY
P. I. Elliott
ATTORNEY

J. R. MURPHY.
CAR STAKE.
APPLICATION FILED AUG. 1, 1911.

1,056,290.

Patented Mar. 18, 1913.
3 SHEETS—SHEET 3.

WITNESSES:
Thomas Langford
Charles C. Cook

INVENTOR
John R. Murphy
BY
W. J. Elliott
ATTORNEY

UNITED STATES PATENT OFFICE.

JOHN R. MURPHY, OF TACOMA, WASHINGTON.

CAR-STAKE.

1,056,290.   Specification of Letters Patent.   Patented Mar. 18, 1913.

Application filed August 1, 1911.   Serial No. 641,727.

*To all whom it may concern:*

Be it known that I, JOHN R. MURPHY, a citizen of the United States, residing at Tacoma, in the county of Pierce and State of Washington, have invented a new and useful Car-Stake, of which the following is a specification.

This invention relates to car stakes, and especially to those adapted to be used on logging cars.

The invention has for its objects to provide a stake which is held firmly in position when in its operating position; which is easily tripped from said operating position; which falls therefrom into a withdrawn position which is not in the way of the bulkheading or other structure which may be positioned beside the track.

Further objects of the invention are, to distribute the spreading strain between the stakes on the two sides of a car without transmitting the said strain through the car structure; to allow logs to be loaded on the car over the stakes when they have been set up into operative position; and to protect the side sills of the car from breakage.

I attain these and other objects by the devices, mechanisms and arrangements illustrated in the accompanying drawings, in which—

Figure 3:
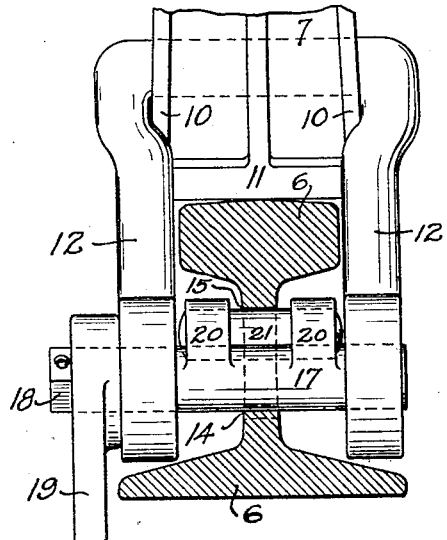
Figure 4:
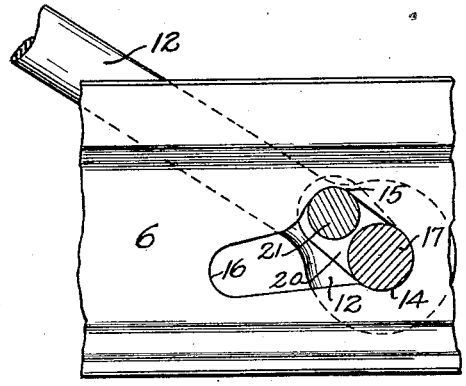
Figure 5:
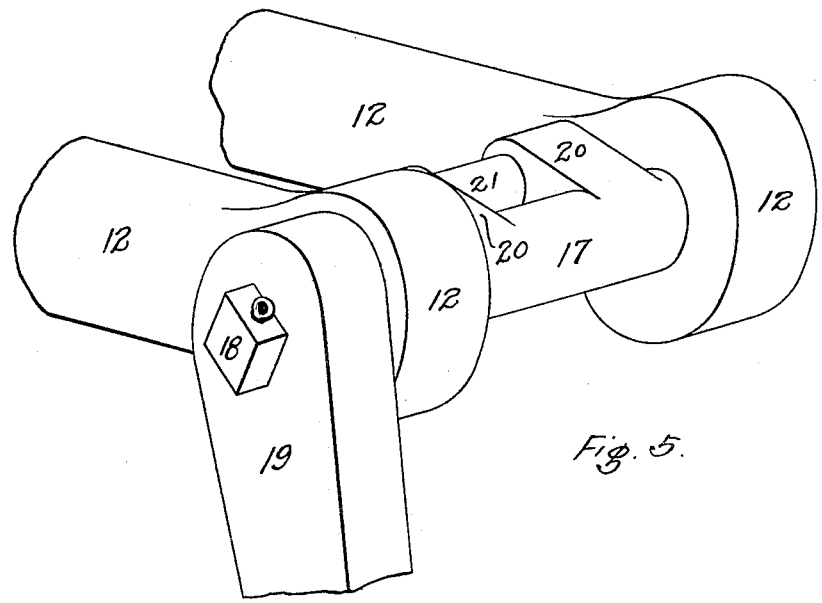
Figure 6:
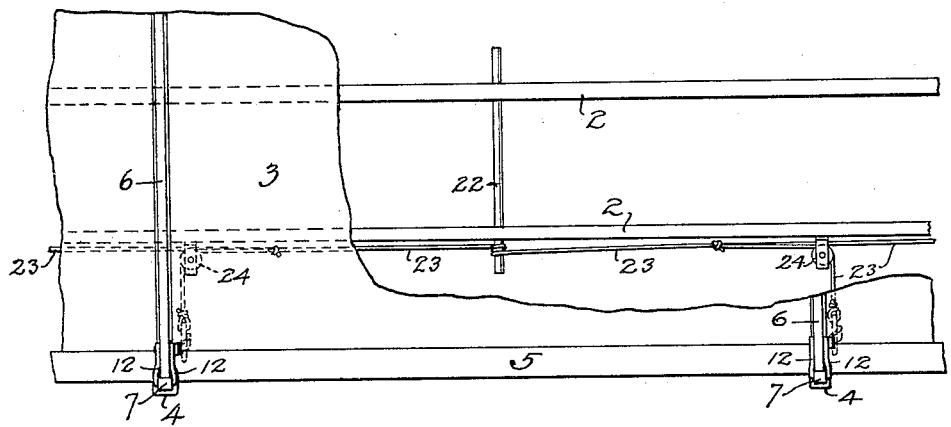
Figure 7:
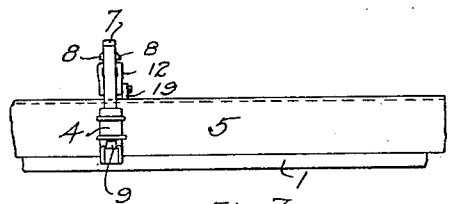
Figure 8:
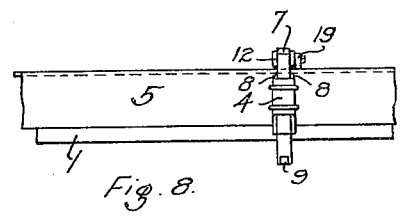
Figure 9:
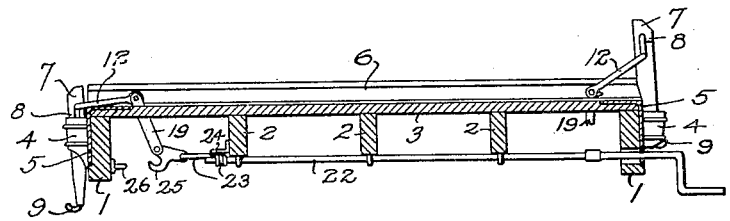
Figure 10:

Figure 1 is a cross-section of a portion of a car showing my improved stake mounted thereon and in its operative position; Fig. 2 is a similar view showing, however, the stake in its withdrawn position; Fig. 3 is a cross-section of one of the bunker rails showing the stake-holding link and the lock therefor; Fig. 4 is a side elevation of a portion thereof showing one side of the link and showing the lock in section; Fig. 5 is a perspective view of a portion of the link and lock; Fig. 6 is a plan view of a portion of a car, showing a portion of the deck broken away to reveal the lock operating mechanism; Fig. 7 is a side elevation of a portion of the car deck showing the stake in operative position and showing the sill guard; Fig. 8 is a similar view showing, however, the stake in withdrawn position; Fig. 9 is a cross-section of a car showing the stake on one side withdrawn while that on the other side is in operative position; and Fig. 10 is a section of the lock-operating rod, showing its connection to the operating cable.

Similar numerals of reference refer to similar parts throughout the several views.

The car body is of the usual construction and consists of two side sills 1, with various intermediate sills 2, covered by a decking 3. On each side of the car are mounted a plurality of stake pockets 4 which may be of the usual construction. Between the stake pockets 4 and the side sills 1, are mounted angle irons or plates 5 on each side of the car and extending substantially from end to end and of such form as to extend a part way down the sill 1 and also a part way over the deck 3. Across the car, and above its deck 3, and secured to the plates 5 by suitable means, are a plurality of bunker-rails 6, said rails being positioned in line with the stake pockets 4. The stakes 7 are all similar in construction and operation. Each stake is adapted to pass freely in the stake pocket 4 and is kept from falling therethrough, when in its withdrawn position, by means of side ears or lugs 8 which engage the upper surface of the stake pocket 4. Each stake is provided at its lower end with a hook extension 9 adapted to engage, when in its operative position, with the lower, outer, edge of the stake pocket 4. Each stake 7 is provided with a recess, formed by two side flanges 10 and a shoulder 11 joining them, into which the end of the bunker rail 6 fits, the said shoulder 11 resting on top of the rail 6 and the flanges 10 being on each side thereof when the stake is in its operative position. The stake 7 is held on the rail 6 by means of a clevis or open link 12 which passes through an elongated hole 13 in the stake 7, above the shoulder 11. The link 12 passes from the stake 7 on each side of the rail 6, and has its open end closed by a lock-piece which passes through and engages the web of said rail 6 (Fig. 3). When this lock-piece is in one position it prevents the link 12 from sliding toward the side of the car and therefore holds the stake 7 on the end of the rail, but when it is turned to another position it permits the free movement of the link along the rail and allows the stake to be pushed off the end of the rail. When the stake is thus pushed, it falls into the stake pocket 4 until the ears 8 thereof engage the top of the pocket; meantime the link 12 has turned on the lock-piece and fallen until it engages the flange of the rail 6, in which position it is arrested and the cross-piece thereof slides in the elongated hole 13 in the stake to the upper end thereof (Fig. 2).

The locking mechanism engages and acts through the web of the rail 6, in which a suitable hole has been cut. This hole is irregular in shape and consists of three main portions:—the recess 14 which is adapted to receive the shank of the lock-piece when in the locked position, the recess 15 which is adapted to receive the locking roller when in the locked position, and the recess 16 which is adapted to receive the lock-piece when in the unlocked position. Each end of the link 12 is looped to form an eye through which the ends of the shank 17 pass. One end 18 of the shank 17 extends farther through the link 12 than does the other end, and this projecting portion is squared to receive the end of the operating lever 19 which has a suitable hole therethrough, said lever being held thereon by means of a split key or other suitable device. That portion of the shank 17 between the eyes of the link 12 is provided with two lugs or arms 20 extending out therefrom and a roller 21 is held by these arms. This roller is free to turn in the arms 20 but is otherwise held thereby. When the locking mechanism is in locked position, the roller 21 engages the rail web in the recess 15, but if the lever 19 is actuated to turn the shank 17 in the recess 14 the roller 21 is forced from the recess 15 into the recess 16 which is so shaped that the entire locking mechanism may slide freely therein toward the end of the bunker rail 6. The parts of the locking mechanism are assembled as follows:—The link 12 is passed through the hole 13 in the stake 7, its ends being slightly spread; then the shank 17 with the roller 21 mounted therein is passed through the hole in the rail 6 and the squared end is passed through the eye in the link 12; then the other eye is sprung over the other end of the shank and the link is bent to position; then the lever 19 is mounted on the squared end and the key is passed therethrough to hold it in position.

The stakes on one side of the car are all unlocked at the same time by means of an operating rod 22, hung across the car near the center thereof and adapted to be rotated from the other side of the car by any suitable means. The end of this rod 22 engages a cable 23, leading in both directions therefrom, said cable being supported below the outer intermediate sill 2 by suitable sheaves 24. This cable 23, or connections therewith, passes to each of the car stake locks, being secured to the end of the hooks 25, pivoted to the ends of the operating levers 19, and engaging suitable eyes 26 secured to the side sills 1 of the car. When the cable 23 is loose, the lever 19 is free to assume any position and when the stake is elevated to its operative position, the roller 21 enters the recess 15 and the lever 19 falls into a vertical position. As soon as the lever assumes this vertical position the hook 25 pivoted thereto engages the eye 26 on the sill 1 and prevents the accidental swinging of the lever 19 away from this vertical position. When, however, the rod 22 is rotated it winds the cable 23 on its end, thus pulling the levers 19 thereon so as to swing the rollers 21 out of the recesses 15, then the side strain on the logs pushes the stakes 7 so that the shoulders 11 thereof slip off the ends of the rails 6 and the locking devices slide into the recesses 16, and the stakes 7 fall downward in the pockets 4.

It will be noted that the vertical strain of the logs on the stakes 7 is transmitted by the shoulders 11 and the rails 6 to a point directly over the side sills 1, thereby relieving the pockets or brackets from the strain usually borne by them, but that the spreading strain thereof is not transmitted to the car but passes to the other side of the load through the links 12, shanks 17, rollers 21, and rails 6 to the corresponding parts on the other side of the car. It will further be noted that the position and shape of the hole in the rail web is such that when the stake is in its operative position and the roller 21 is in the recess 15, the strain from the stake through the link 12 tends to hold the roller in the recess 15.

Having described my invention, what I claim is—

1. In a car stake, the combination with a stake pocket mounted on a car; of a stake loosely mounted therein; a hook formed on the lower end of said stake and adapted to engage the lower end of said pocket; a bunker mounted across said car; a shoulder formed on said stake and engaging said bunker whereby said stake is vertically supported thereon; a link engaging said stake and said bunker whereby said stake is transversely held on said bunker; and means whereby said link is disconnected from the bunker and the stake is freed from being held thereon.

2. In a car stake, the combination with a bunker mounted across a car and having a recessed hole therethrough; of a stake; a shoulder formed on said stake and engaging said bunker whereby said stake is vertically supported thereon; a link engaging said stake and passing to each side of said bunker adjacent the hole therethrough; a locking piece passing through the hole in said bunker and pivotally engaging the ends of said link; a roller eccentrically supported by said locking piece and passing through the hole in said bunker and engaging in a recess thereof to hold the link against transverse motion on the bunker; and an operating lever mounted on said locking piece and adapted to rotate it in the ends of the link whereby said roller is withdrawn from the said recess and said stake is freed from being held on the bunker.

JOHN R. MURPHY.

Witnesses:
A. M. RICHARDS,
A. ALLEN.

Copies of this patent may be obtained for five cents each, by addressing the "Commissioner of Patents, Washington, D. C."